(12) United States Patent
Spencer et al.

(10) Patent No.: US 11,149,126 B2
(45) Date of Patent: Oct. 19, 2021

(54) FIRE-RETARDANT COMPOSITE MATERIALS

(71) Applicant: Gurit (UK) Ltd., Newport (GB)

(72) Inventors: Paul John Spencer, Southampon (GB); Glynn John Edwards, Newport (GB); Amy Alexandra Ferris, Cowes (GB)

(73) Assignee: Gurit (UK) Ltd., Newport (GB)

( * ) Notice: Subject to any disclaimer, the term of this patent is extended or adjusted under 35 U.S.C. 154(b) by 0 days.

(21) Appl. No.: 16/764,220

(22) PCT Filed: Nov. 23, 2018

(86) PCT No.: PCT/EP2018/082370
§ 371 (c)(1),
(2) Date: May 14, 2020

(87) PCT Pub. No.: WO2019/101923
PCT Pub. Date: May 31, 2019

(65) Prior Publication Data
US 2021/0002439 A1   Jan. 7, 2021

(30) Foreign Application Priority Data
Nov. 24, 2017   (GB) ..................... 1719564

(51) Int. Cl.
*C08J 5/24* (2006.01)
*C08K 3/32* (2006.01)
(Continued)

(52) U.S. Cl.
CPC ............... *C08J 5/24* (2013.01); *B29C 70/06* (2013.01); *B32B 3/12* (2013.01); *B32B 15/092* (2013.01);
(Continued)

(58) Field of Classification Search
None
See application file for complete search history.

(56) References Cited

U.S. PATENT DOCUMENTS 3,839,239 A    10/1974  Godfried
6,663,737 B2 * 12/2003  Hsiao ................. B32B 5/12
                                            156/160
(Continued)

FOREIGN PATENT DOCUMENTS

CN    103435973 A    12/2013
CN    106926516 A     7/2017
(Continued)

OTHER PUBLICATIONS

English abstract of CN 103979098 A, Aug. 13, 2014, 10 pages, China.*

(Continued)

*Primary Examiner* — Tae H Yoon
(74) *Attorney, Agent, or Firm* — Poisinelli, P.C.

(57) ABSTRACT

A prepreg for the manufacture of a fibre-reinforced composite material having fire retardant properties, the prepreg comprising from 42 to 52 wt % of an epoxide resin matrix system and from 48 to 58 wt % fibrous reinforcement, each wt % being based on the total weight of the prepreg, the fibrous reinforcement being at least partially impregnated by the epoxide resin matrix system;
  wherein the epoxide resin matrix system includes as components:
  a. a mixture of (i) at least one epoxide-containing resin and (ii) at least one catalyst for curing the at least one epoxide-containing resin; and
  b. a plurality of solid fillers for providing fire retardant properties to the fibre-reinforced composite material formed after catalytic curing of the at least one epoxide-containing resin, (Continued)

wherein the weight ratio of component a. to component b. is from 1.4:1 to 1.86:1.

23 Claims, 3 Drawing Sheets

(51) Int. Cl.

| | |
|---|---|
| C08K 5/3492 | (2006.01) |
| C08K 3/40 | (2006.01) |
| C08K 13/02 | (2006.01) |
| C09K 21/10 | (2006.01) |
| C09K 21/04 | (2006.01) |
| B29C 70/06 | (2006.01) |
| B32B 27/38 | (2006.01) |
| B32B 3/12 | (2006.01) |
| B32B 27/10 | (2006.01) |
| B32B 15/092 | (2006.01) |
| B32B 15/20 | (2006.01) |
| B32B 15/14 | (2006.01) |
| B29K 63/00 | (2006.01) |
| B29K 105/08 | (2006.01) |
| B29K 105/16 | (2006.01) |
| B29K 509/02 | (2006.01) |
| B29K 509/08 | (2006.01) |
| B29L 31/30 | (2006.01) |

(52) U.S. Cl.
CPC .............. *B32B 15/14* (2013.01); *B32B 15/20* (2013.01); *B32B 27/10* (2013.01); *B32B 27/38* (2013.01); *C08K 3/32* (2013.01); *C08K 3/40* (2013.01); *C08K 5/34922* (2013.01); *C08K 13/02* (2013.01); *C09K 21/04* (2013.01); *C09K 21/10* (2013.01); *B29K 2063/00* (2013.01); *B29K 2105/089* (2013.01); *B29K 2105/16* (2013.01); *B29K 2509/02* (2013.01); *B29K 2509/08* (2013.01); *B29K 2995/0016* (2013.01); *B29L 2031/3041* (2013.01); *B32B 2250/40* (2013.01); *B32B 2305/024* (2013.01); *B32B 2305/076* (2013.01); *B32B 2307/3065* (2013.01); *B32B 2605/003* (2013.01); *B32B 2605/10* (2013.01); *B32B 2605/18* (2013.01); *C08J 2363/00* (2013.01); *C08K 2003/323* (2013.01)

(56) References Cited

U.S. PATENT DOCUMENTS

| | | | |
|---|---|---|---|
| 9,534,108 B2* | 1/2017 | Timberlake | C08K 5/5317 |
| 9,914,662 B2* | 3/2018 | Arii | C03C 25/34 |
| 2008/0315164 A1 | 12/2008 | Chih-Feng | |
| 2011/0319525 A1 | 12/2011 | Maeda et al. | |
| 2016/0230001 A1 | 8/2016 | Spencer et al. | |
| 2019/0027913 A1* | 1/2019 | Sang | B32B 27/283 |

FOREIGN PATENT DOCUMENTS

| | | |
|---|---|---|
| EP | 3219758 A1 | 9/2017 |
| GB | 2472423 A | 2/2011 |
| GB | 2512992 A | 10/2014 |
| GB | 2514189 A | 11/2014 |
| GB | 2531051 A | 4/2016 |
| WO | 2017/161843 A1 | 9/2017 |

OTHER PUBLICATIONS

English abstract of CN 106810819 A, Jun. 9, 2017, 8 pages, China.*
Combined Search and Examination Report under Sections 17 and 18(3) in corresponding GB application No. 1719564.5 dated May 14, 2018.
International Search Report and Written Opinion in corresponding international application No. PCT/EP2018/082370 dated Feb. 20, 2019.
XP002788623, Database WPI, week 201802, Thompson Scientific, London, GB, Nov. 17, 2017.
International Preliminary Report on Patentability issued on corresponding international application PCT/EP2018/082370 dated May 26, 2020.

* cited by examiner

FIRE-RETARDANT COMPOSITE MATERIALS

This application is a 371 of international application PCT/EP2018/082370 filed on Nov. 23, 2018, which is a continuation of GB Application No. 1719564.5 filed on Nov. 24, 2017.

FIELD OF THE INVENTION

The present invention relates to fire-retardant fibre-reinforced composite materials and to prepregs therefor. The present invention also relates to fire-retardant sandwich panels.

BACKGROUND

It is well known to use fibre-reinforced resin composite materials for the manufacture of structural and decorative components in a variety of industrial sectors. For some applications, the fibre-reinforced resin composite materials are manufactured from what are known in the art as prepregs—a prepreg comprises fibrous material pre-impregnated with a resin, and the amount of resin is matched to the amount of fibre so that after plural prepregs have been laid up into a mould and the resin has cured, optionally with a preliminary full wetting out of the fibrous material by the resin if the prepreg was initially not fully impregnated, a unitary fibre-reinforced composite material moulding is formed with the correct ratio of fibre to resin so that the material has the required material properties.

When a composite material is used for interior panel construction for mass transport applications, such as aerospace, trains, ferries, etc., in particular for the interiors of such vehicles, a fire, smoke and toxicity requirement is necessary. Historically, composite materials such as phenolic, cyanate-ester, sheet moulding compound (SMC), modified vinyl-ester and halogenated epoxides have been used for these applications.

Prepregs employing a phenolic-based resin have been historically used for interior panels in aerospace and mass transit applications for many decades. Typically, the interior panels for passenger aircraft are currently made from a sandwich structure using fibre-reinforced phenolic resin skins on a honeycomb core. The core thickness typically varies from 3.2 mm to 12.7 mm (⅛" to ½"). The skin is typically a single ply of woven glass fabric impregnated with a phenolic resin matrix system, although more than one ply of woven glass fabric impregnated with a phenolic resin matrix system may be employed. The honeycomb core is typically composed of aramid fiber paper coated with a phenolic resin, for example Nomex® honeycomb available in commerce from Du Pont, USA.

Although such phenolic resins offer excellent fire, smoke and toxicity ("FST") properties, there is an industry desire to seek replacement resin materials for such prepregs which offer improved surface properties for the resultant sandwich panels, as well as improved health and safety performance, and lower-cost processing, than phenolic resins, without compromising the FST properties provided by the known phenolic resin panels.

Phenolic resins for use in such prepregs are cured using a condensation reaction which releases volatiles and water during curing. This requires the use of press-curing under an imposed pressure in order to impart high pressures (6 bar) to reduce the expansion of large voids within the laminate during curing of the resin. Such voids would otherwise decrease the mechanical properties of the laminate. Secondly, the release of volatiles creates poor surface finishes that require significant filling and fairing of the cured components at a substantial additional cost. The release of volatile components, and solvents, also results in the need to take specific health and safety precautions when using such phenolic resins. Therefore, in addition to the additional cost of filling and fairing, the phenolic matrix in currently available phenolic resin prepregs also has a poor health and safety rating due to free formaldehyde and residual phenol.

Many phenolic resin aerospace component manufacturers have problems with the final surface quality of the phenolic resin component when removing from the mould and have to spend time filling and fairing to enable the required surface quality for painting or applying protective films, for example composed of polyvinyl fluoride, for example Tedlar® polyvinyl fluoride films available in commerce from Du Pont, USA.

A first primary surface quality defect of phenolic resin sandwich panels is the presence of porosity in the cured phenolic resin layer, particularly at a surface intended to be a cosmetic "A" surface which is mounted or intended to be viewed in use, for example an interior surface of an aircraft wall lining panel. The porosity is generally related to the void content in the cured phenolic resin layer, and a good surface finish is generally associated with low void content.

A second primary surface quality defect is known as "telegraphing". Phenolic resin prepregs are used to form outer surface layers of sandwich panels incorporating a central core layer. Telegraphing is exhibited in a sandwich panel incorporating a cured phenolic resin layer moulded onto a core layer comprising a non-metallic honey comb material, for example a honeycomb material composed of aramid fiber paper coated with a phenolic resin, for example Nomex® honeycomb available in commerce from Du Pont, USA. Telegraphing is a defect caused by the surface ply of the cured phenolic resin layer being slightly depressed into each cell of the honeycomb creating a dimpled texture, similar in visual appearance to the texture of a golf ball. This kind of defect is more prevalent when the component is manufactured under vacuum bag curing conditions, where the moulding pressure is provided by applying a vacuum and therefore by atmospheric pressure alone, than under press-moulding which does not use a vacuum.

These types of sandwich panels for interior panel constructions for transport applications, such as for aerospace interiors, are typically made by three common processes. In one known process, which is typically used for components having a complex shape, the sandwich components are laid up in an open mould and then subjected to a vacuum bag moulding process with the resin being cured in an oven or an autoclave. In a second known process, the sandwich components are compression moulded in a press; the process is known in the art as the "crushed core" process because some parts of the panel are crushed to a lower thickness than other parts. In a third known process, the sandwich components are compression moulded to form flat panels in a Multiple Opening Press (MOP) process.

As aircraft production numbers increase, it is also desirable that the resin matrix in the prepreg cures quickly to enable faster production cycle times to manufacture sandwich panels. In addition, there is a desire to reduce tooling costs and to increase production capacity on the more expensive capital equipment items, for example presses, autoclaves and ovens.

The mechanical properties of the phenolic resins are generally much lower than that of an epoxy resin but in general the mechanical requirements for aircraft interior components are low. However, it should be expected that in the future that may be an increased requirement for aircraft interior panels to have increased mechanical properties as compared to current panels. Therefore it would be desirable to produce a sandwich panel in which the surface composite material layers have increased mechanical properties as compared to current known phenolic resin sandwich panels.

Catalytically-cured epoxide resins are well known in the composites industry to offer excellent mechanical properties and good health and safety properties. They are however, intrinsically flammable materials and, when used unmodified, are not suitable for applications where fire, smoke and toxicity properties are required. This has mitigated against their use in the aerospace industry, particularly for interior components. Epoxides have commonly been modified with halogens (such as bromine and chlorine) in order to impart fire-retardant properties to the cured matrix. The two main disadvantages to this approach are high toxicity of smoke during combustion and poor health and safety characteristics associated with the material in both the uncured and cured state.

Therefore despite the problems with phenolic resins as described above, and in light of the disadvantages of epoxy resins as also described above, phenolic resins have been very hard to displace from these aerospace applications, particularly for interior components, due to their excellent smoke, flame resistance and heat release properties. Furthermore, phenolic resins have a low cost compared to other chemicals that have the required FST properties.

SUMMARY OF THE INVENTION

The present inventors have addressed these problems of known composite materials and have aimed to provide fire-retardant fibre-reinforced composite materials, and prepregs therefor, which can exhibit good fire-retardant properties in combination with good surface properties and aesthetic properties, as well as good mechanical properties, and in conjunction with good processability, with regard to cost and health and safety considerations.

The present invention aims to provide a composite material, including a prepreg for producing the composite material and a sandwich panel made from the composite material, which can provide the combination of the following properties: the heat release, smoke and flammability properties of the composite material on combustion should be close to those of current commercial phenolic resins; an improved surface finish as compared to current commercial phenolic resins should be achieved to reduce/eliminate fill and fairing; a fast curing resin system should be present; a similar price to that of current commercial phenolic resin prepregs should be available; and good mechanical performance properties for adhesion to a core material, such as a honeycomb core material, should be provided. Also, the composite material, a prepreg for producing the composite material and sandwich panel made from the composite material should provide improved health and safety characteristics as compared to the current use of uncured and cured phenolic resins.

Accordingly, in a first aspect, the present invention provides a prepreg for the manufacture of a fibre-reinforced composite material having fire retardant properties, the prepreg comprising from 42 to 52 wt % of an epoxide resin matrix system and from 48 to 58 wt % fibrous reinforcement, each wt % being based on the total weight of the prepreg, the fibrous reinforcement being at least partially impregnated by the epoxide resin matrix system;
wherein the epoxide resin matrix system comprises the components:
a. a mixture of (i) at least one epoxide-containing resin and (ii) at least one catalyst for curing the at least one epoxide-containing resin; and
b. a plurality of solid fillers for providing fire retardant properties to the fibre-reinforced composite material formed after catalytic curing of the at least one epoxide-containing resin,
wherein the weight ratio of component (a) to component (b) is from 1.4:1 to 1.86:1.

In a second aspect, the present invention provides a method of making a fire-retardant sandwich panel according to the present invention, the method comprising the steps of:
i. providing a core layer;
ii. disposing a prepreg according to the present invention onto a surface of the core layer to form a sandwich panel pre-assembly;
iii. heating the sandwich panel pre-assembly to a curing temperature of the at least one epoxide-containing resin by the at least one catalyst, wherein in step iii the at least one epoxide-containing resin, and optionally the at least one catalyst, liquefy and wet the surface of the core layer.

In a third aspect, the present invention provides a method of making a fire-retardant sandwich panel, the method comprising the steps of:
i. providing a core layer;
ii. disposing a prepreg onto a surface of the core layer to form a sandwich panel pre-assembly, the prepreg comprising an epoxide resin matrix system and fibrous reinforcement, the fibrous reinforcement being at least partially impregnated by the epoxide resin matrix system;
wherein the epoxide resin matrix system comprises the components:
a. a mixture of (i) at least one epoxide-containing resin and (ii) at least one catalyst for curing the at least one epoxide-containing resin; and
b. a plurality of solid fillers for providing fire retardant properties to the fibre-reinforced composite material formed after catalytic curing of the at least one epoxide-containing resin;
iii. heating the sandwich panel pre-assembly to a curing temperature of the at least one epoxide-containing resin by the at least one catalyst, wherein in step iii the at least one epoxide-containing resin, and optionally the at least one catalyst, liquefy to form a liquid-forming component which wets the surface of the core layer, wherein the liquid-forming component has a weight of from 140 to 205 $g/m^2$.

In a fourth aspect, the present invention provides a fire-retardant sandwich panel for use as an interior wall element in a vehicle, the sandwich panel comprising a core layer and an outer surface layer bonded to a surface of the core layer, wherein the outer surface layer comprises a fibre-reinforced composite material formed from at least one layer of a prepreg according to the present invention, the fibre-reinforced composite material comprising the fibrous reinforcement in a matrix of the cured epoxide resin.

In a fifth aspect, the present invention provides a fire-retardant sandwich panel for use as an interior wall element in a vehicle, the sandwich panel comprising a core layer and an outer surface layer bonded to a surface of the core layer, wherein the outer surface layer comprises a fibre-reinforced composite material comprising from 42 to 52 wt % of a cured epoxide resin matrix and from 48 to 58 wt % fibrous reinforcement, each wt % being based on the total weight of the fibre-reinforced composite material, wherein the cured epoxide resin matrix comprises the components:
a. a cured epoxide resin; and
b. a plurality of solid fillers dispersed throughout the cured epoxide resin for providing fire retardant properties to the fibre-reinforced composite material, wherein the weight ratio of component a. to component b. is from 1.4:1 to 1.86:1

Preferred features of these aspects of the present invention are defined in the respective dependent claims.

The preferred embodiments of the present invention can provide an epoxy resin prepreg that meets the primary requirement of the heat release and FST requirements which has been the major hurdle to be overcome by epoxy resin products for these aerospace applications in order to be competitive to, or exceed the performance of, current commercial phenolic resins. The prepreg can also produce a high quality cosmetic surface, for example for use as an "A" surface of a panel, which is in use mounted or intended to be seen, for example as an interior surface of an aircraft cabin.

An advantage of an epoxide resin as a monomer molecule for producing a cured thermoset resin is that the epoxide resin is cured in a catalytic addition reaction rather than a condensation reaction and so, unlike phenolic resins, the epoxide resin does not evolve any by-product during the curing reaction. Therefore when the epoxy resin used in the preferred embodiments of the present invention is cured no volatiles are evolved that might cause surface porosity.

Epoxy resins also exhibit excellent adhesive properties and mechanical properties. Therefore the epoxy resins used in the preferred embodiments of the present invention can easily meet the adhesive bonding requirements to enable the epoxy resin surface layers to bond strongly to the surface of a honeycomb core material, for example composed on Nomex® honeycomb.

The chemistry of epoxy resins also enables fast cure times over a selectable range of curing temperatures, depending upon the selection of the catalyst, and optionally the accelerator, making epoxy resins used in the preferred embodiments of the present invention suitable for the three main moulded panel production processes of vacuum bag processing, crushed core processing, and MOP processing as described above.

The prepregs comprise epoxy resin in combination with the fibrous reinforcement, typically in the form of a fabric. The FST properties of epoxy resins used in the preferred embodiments of the present invention have been achieved by adding various solid fire retardant components to the epoxy formulation, in particular solid fillers, typically in particulate form, and as a result the liquid content of the prepreg, the liquid being present during curing of the prepreg at an elevated curing temperature, is relatively low as compared to epoxy prepregs which do not exhibit FST properties.

The present invention is at least partly predicated on the finding by the present inventors that although a low liquid content during curing of the resin in the prepreg is not a problem for the FST performance of the resultant cured composite material, the low liquid content can have an impact on mechanical adhesion of the resultant cured composite material to the honeycomb core. In addition, the low liquid content can have a detrimental effect on surface porosity of the cured sandwich panel if there is not enough liquid to create a coherent continuous layer at the tool-to-prepreg interface.

In particular, the present invention is at least partly predicated on the finding by the present inventors that there is a critical minimum liquid resin content that provides a combination of both (i) good adhesion strength to the honeycomb core and (ii) a good surface finish in the sandwich panel.

In one aspect of the present invention, it has been found that the liquid resin content minimum threshold is 140 gsm to produce a good surface finish, at least one side of a panel to enable that side to be used as a cosmetic "A" surface, for example as an interior cosmetic "A" surface of an aircraft cabin. The liquid resin content is the content of liquid resin during curing.

For example, it has been found that with a 300 gsm (grams per square metre) fabric, which is a standard fabric weight for aircraft interior sandwich panels, the liquid resin content minimum threshold is 140 gsm to produce a good surface finish, for example in the crush core process.

BRIEF DESCRIPTION OF THE DRAWINGS

Preferred embodiments of the present invention will now be described by way of example only with reference to the accompanying drawings, in which:—

DETAILED DESCRIPTION

Figure 1:
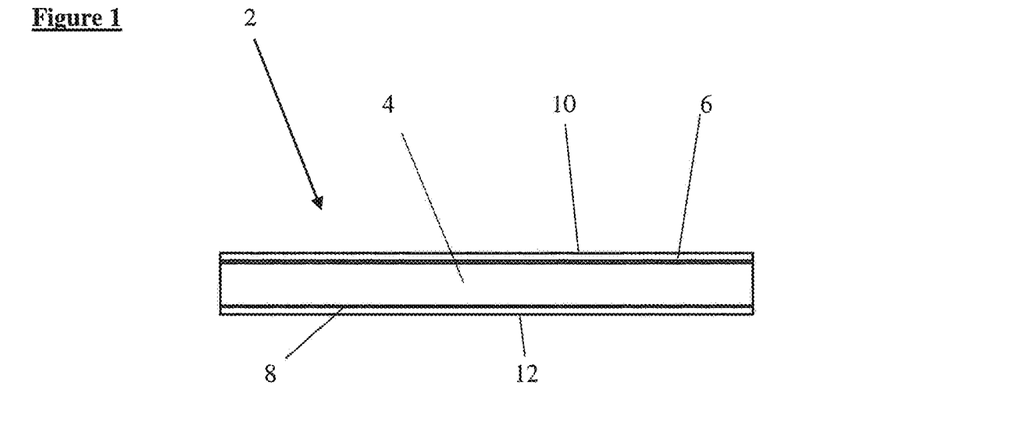
FIG. 1 is a schematic side view of a sandwich panel pre-assembly incorporating a prepreg and a core in accordance with an embodiment of the present invention.
Figure 2:
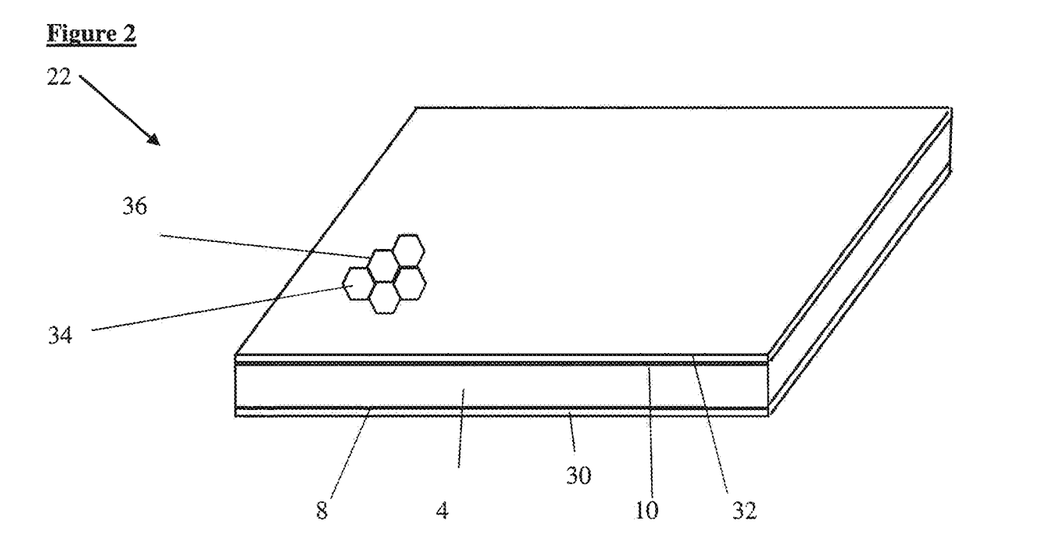
FIG. 2 is a schematic perspective view of a sandwich panel in accordance with an embodiment of the present invention produced from the pre-assembly of claim 1.

Referring to FIG. 1, there is shown a sandwich panel pre-assembly incorporating a prepreg and a core in accordance with an embodiment of the present invention prepreg. The prepreg is formulated for the manufacture of a fibre-reinforced composite material having fire retardant properties. The sandwich panel pre-assembly is used to produce a sandwich panel as shown in FIG. 2. FIGS. 1 and 2 are not to scale and some dimensions are exaggerated for the sake of clarity of illustration.

As shown in FIG. 1, the sandwich panel pre-assembly 2 comprises a central core layer 4 having opposite surfaces 6, 8. The prepreg layer 10, 12 is disposed on each respective surface 6, 8 of the core layer 4.

The sandwich panel pre-assembly 2 is used to produce a fire retardant sandwich panel 22 as shown in FIG. 2. The sandwich panel pre-assembly 22 comprises the central core layer 4 having opposite surfaces 6, 8. An outer layer 30, 32 of fibre-reinforced resin matrix composite material, each formed from a respective prepreg layer 10, 12, is bonded to a respective surface 6, 8 of the core layer 4. Typically, the fire-retardant sandwich panel 22 is moulded to comprise an interior panel of a vehicle, optionally an aircraft or a railway vehicle. The bonding together of the outer layers 30, 32 of fibre-reinforced resin matrix composite material to the core layer 4 is achieved during the moulding process for forming the sandwich panel 22 and the epoxy resin system in the prepreg layers 10, 12 bonds directly to the surfaces 6, 8 of the core layer 4.

In the sandwich panel 22 of the illustrated embodiment, two opposite outer layers 30, 32 of fibre-reinforced resin matrix composite material, are provided, each outer layer 30, 32 being bonded to a respective opposite surface 6, 8 of the core layer 4.

However, the present invention can alternatively produce a sandwich panel having a two layer structure comprising a core layer and a single layer of fibre-reinforced composite material on one surface of the core layer, which is formed by providing a prepreg layer on one side of the core layer in the sandwich panel pre-assembly.

The core layer 4 is composed of a structural core material comprising a non-metallic honey comb material. Typically, the honey comb material is composed of aramid fiber paper coated with a phenolic resin, for example Nomex® honeycomb available in commerce from Du Pont, USA. The honeycomb material comprises an array of elongate cells 34 which extend through the thickness of the core layer 4 so that, as shown in FIG. 2, each opposite surface 6, 8 of the core layer 4 is an end surface of the honeycomb material including a matrix surface 36 surrounding a plurality of cells 34. The matrix surface 36 and cells 34 are shown notionally uncovered in FIG. 2 for the sake of clarity of illustration, but they are covered by the outer layers 30, 32 of fibre-reinforced resin matrix composite material, although if the outer layers 30, 32 are translucent then the matrix surface 36 and cells 34 can be seen through the outer layers 30, 32). The core layer 4 typically has a thickness of from 3 to 25 mm, although other core thicknesses may be employed.

In alternative embodiments, the core layer 4 may be composed of a structural foam, for example a polyethersulphone (PES) foam (e.g. sold by Diab under the trade name Divinycell®).

In alternative embodiments, the core layer 4 may be a honeycomb core material composed of aluminium or an aluminium alloy.

The prepreg of the prepreg layers 10, 12 comprises an epoxide resin matrix system and fibrous reinforcement which is at least partially impregnated by the epoxide resin matrix system. Preferably, the prepreg is halogen-free and/or phenolic resin-free.

In preferred embodiments of the present invention, the prepreg of the prepreg layer 10, 12 has a total weight of from 500 to 650 g/m² and/or the fibrous reinforcement has a weight of from 250 to 350 g/m², optionally from 275 to 325 g/m².

The fibrous reinforcement may comprise one or more materials such as glass fibre, aramid fibre, carbon fibre, or PAN or pitch based carbon fibre. The fibrous reinforcement may comprise a woven or non-woven fabric.

The epoxide resin matrix system comprises the components:

a. a mixture of (i) at least one epoxide-containing resin and (ii) at least one catalyst for curing the at least one epoxide-containing resin; and b. a plurality of solid fillers for providing fire retardant properties to the fibre-reinforced composite material formed after catalytic curing of the at least one epoxide-containing resin.

In preferred embodiments of the present invention, in component (a) the at least one epoxide-containing resin comprises a mixture of at least two epoxide-containing resins and has a liquid/solid weight ratio of from 1.3:1 to 1.475:1, typically from 1.35:1 to 1.45:1, for example from 1.38:1 to 1.39:1, the liquid and solid constituents being liquid or solid at room temperature (20° C.). In component (b), the at least one catalyst may be a liquid catalyst, or alternatively the at least one catalyst may comprise from 40 to 60 wt % solid and from 60 to 40 wt % liquid, each wt % being based on the weight of the catalyst and determined at room temperature (20° C.).

In preferred embodiments of the present invention, the at least one epoxide-containing resin, and optionally the at least one catalyst, comprise a liquid-forming component of the prepreg, which liquid-forming component is adapted to liquefy during at a curing temperature during curing of the at least one epoxide-containing resin by the at least one catalyst, and wherein the liquid-forming component of the prepreg has a weight of from 140 to 205 g/m². Typically, the liquid-forming component of the prepreg has a weight of from 150 to 180 g/m², typically from 155 to 170 g/m².

The epoxide-containing resin may further comprise a catalyst carrier which acts to assist incorporation of the latent catalyst for the epoxide resin into the composition. Typically, the catalyst carrier comprises a diglycidyl ether of bisphenol F liquid resin. For example, the catalyst carrier may comprise a diglycidyl ether of bisphenol F liquid resin available in commerce under the trade name Epikote 862 from Resolution Performance Products.

The catalyst carrier may typically be present in the resin composition in an amount of up to 10 wt %, based on the total weight of the epoxide-containing resin.

The at least one catalyst of component (a)(ii) comprises a catalyst, otherwise called a curing agent, suitable for curing epoxide resins, optionally together with at least one additional catalyst additive or modifier. Any suitable catalyst may be used. The catalyst will be selected to correspond to the resin used. The catalyst may be accelerated. The catalyst or curing agent may typically be selected from a dicyandiamide, sulphanilamide, urone, urea, imidazole, amine, halogenated boron complex, anhydride, lewis base, phenolic novolac, or a nitrogen containing compound. Latent curing agents such as dicyandiamide, femurone and imidazole may be cured. Suitable accelerators include Diuron, Monuron, Fenuron, Chlortoluron, his-urea of toluenedlisocyanate and other substituted homologues. Typically, the curing catalyst for the epoxide-containing resin is dicyandiamide, most preferably being in micronized form, and such a catalyst is available in commerce under the trade names Dyhard 100SF from AlzChem Group AG or Amicure CG1200E from Air Products Inc. The curing catalyst may typically be present in the resin composition in an amount of from 1 to 15 wt %, more typically from 2 to 6 wt %, based on the total weight of the epoxide-containing resin. Too low an amount of the curing catalyst may cause a reduced cure of the resin material, whereas too high an amount may cause an excessively exothermic cure.

The curing catalyst may be combined with an additional catalyst additive to reduce the activation energy, and hence the curing temperature, of the primary curing catalyst such as dicyandiamide. Such an additive may comprise urone, available in commerce under the trade names Amicure UR-S or Amicure UR-2T from Air Products Inc. Such an additive may typically be present in the resin composition in an amount of up to 15 wt %, more typically from 1 to 4 wt %, based on the total weight of the epoxide-containing resin.

The curing catalyst may be yet further be combined with an additional additive imidazole-based catalyst or curing agent provided to further reduce the activation energy, and hence the curing temperature, of the urone. In addition, the C=N bonds present in imidazole have been shown to improve the fire-retardant properties of the resultant cured epoxide-resin compared to other catalysts. Such an imidazole-based catalyst or curing agent is available in commerce under the trade name 2MZ-Azine-S from Shikoku, Japan. The imidazole-based catalyst or curing agent may typically be present in the resin composition in an amount of up to 15 wt %, more typically from 1 to 4 wt %, based on the total weight of the epoxide-containing resin. A low amount of the imidazole-based catalyst or curing agent may cause a reduced cure speed and/or reduced curing temperature of the resin material, whereas too high an amount may cause an excessively exothermic cure.

The component (b) comprises a plurality of solid fillers for providing fire retardant properties to the fibre-reinforced composite material formed after catalytic curing of the at least one epoxide-containing resin. The solid fillers promote fire-retardancy and/or reduce generation of smoke, opacity of smoke or toxicity of smoke. Such fillers may be selected from, for example, at least one of zinc borate, melamine cyanurate, red or yellow phosphorus, aluminium trihydroxide (alumina trihydrate), and/or ammonium polyphosphate. The solid fillers may include glass beads or silica beads which are non-flammable. The solid fillers are typically dispersed homogeneously throughout the epoxide resin matrix.

Some known fire retardants are, for example, the fire retardants supplied by Albermarl Corporation under the trade mark Martinal, and under the product names OL-111/LE, OL-107/LE and OL-104/LE, and the fire retardant supplied by Borax Europe Limited under the trade mark Firebrake ZB. The fire retardant mineral filler is typically ammonium polyphosphate, for example available under the trade name Exolit AP 422 from Clariant, Leeds, UK. The smoke suppressant mineral filler is typically zinc borate, available in commerce under the trade name Firebrake ZB. The mineral fillers may optionally be provided together with a filler dispersion additive to aid wetting and dispersion of fillers during manufacture of the matrix resin. Such a filler dispersion additive is available in commerce under the trade name BYK W980 from BYK Chemie, Wesel, Germany.

Typically, the solid fillers for providing fire retardant properties comprise (i) a phosphate component and (ii) (a) a ceramic or glass material precursor for reacting with the phosphate component to form a ceramic or glass material and/or (b) a ceramic or glass material. The solid fillers are present in the form of solid filler particles. The phosphate component may comprise a metal polyphosphate, optionally aluminium polyphosphate, and/or ammonium polyphosphate. The ceramic or glass material precursor may comprise a metal borate, optionally zinc borate. The ceramic or glass material may comprise glass beads.

The prepreg may further comprise, in component (b), a blowing agent as a fire retardant for generating a non-combustible gas when the prepreg is exposed to a fire, and the fire retardant solid fillers and blowing agent are adapted to form an intumescent char when the epoxide resin is exposed to a fire. The blowing agent is part of the solid fillers in the epoxide resin matrix system. A suitable blowing agent is melamine, which is present in the form of solid filler particles.

Other solid filler materials may be provided in component (b) to provide the required fire, smoke and toxicity (FST) properties to the resultant fibre-reinforced resin matrix composite material formed from the prepreg after curing of the epoxide resin matrix system.

In preferred embodiments of the present invention, the epoxide resin matrix system further comprises, in component (b), at least one anti-settling agent for the solid fillers. The anti-settling agent is typically a solid particulate material. The at least one anti-settling agent may comprise silicon dioxide, optionally amorphous silicon dioxide, further optionally fumed silica. The at least one anti-settling agent may be present in an amount of from 0.5 to 1.5 wt % based on the weight of component (a). In particular, an anti-settling additive may be provided to control resin flow during resin curing, for example during curing to adhere the resin matrix to a core. In addition, such an additive can prevent settling of powder particles, such as the fire-retardant and/or smoke suppressant fillers, in the resin formulation during storage/processing. A typical anti-settling additive comprises amorphous silicon dioxide, most typically fumed silica, for example available under the trade name Cabot Cabosil TS-720.

In preferred embodiments of the present invention, the prepreg comprises from 42 to 52 wt % of the epoxide resin matrix system and from 48 to 58 wt % of the fibrous reinforcement, each wt % being based on the total weight of the prepreg. Optionally, the prepreg comprises from 44 to 52 wt % of the epoxide resin matrix system and from 48 to 56 wt % of the fibrous reinforcement, each wt % being based on the total weight of the prepreg. Further, optionally, the prepreg comprises from 46 to 50 wt % of the epoxide resin matrix system and from 50 to 54 wt % of the fibrous reinforcement, each wt % being based on the total weight of the prepreg.

In addition, in preferred embodiments of the present invention, the weight ratio of component (a), i.e. the epoxide-containing resin and catalyst system, to component (b), i.e. the solid fillers for providing fire retardant properties, is from 1.4:1 to 1.86:1, preferably from 1.5:1 to 1.86:1, more preferably from 1.6:1 to 1.7:1, typically from 1.625:1 to 1.675:1, for example about 1.65:1.

In preferred embodiments of the present invention, the weight ratio of the total weight of the prepreg to the weight of component (b) is from 4.5:1 to 6.5:1, optionally from 5:1 to 6:1.

In the method of making a fire-retardant sandwich panel according to the present invention, the core layer 4 is provided. One prepreg layer 10 or each of two prepreg layers 10, 12 as described above is disposed onto a surface 6, 8 of the core layer 4 to form the sandwich panel pre-assembly 2.

Typically, for example when the resultant sandwich panel is for use as an interior panel in a vehicle such as an aircraft and is not required to have high mechanical properties and structural strength, a single ply of the prepreg layer 10, 12 is disposed over a respective surface 6, 8 of the core layer 4. However, in alternative embodiments the resultant sandwich panel may be required to have high mechanical properties and structural strength, and a plurality of plies of the prepreg layer 10, 12 is disposed over a respective surface 6, 8 of the core layer 4.

As described above, the preferred embodiments of the present invention may use any suitable moulding process for forming the panel, for example any of the three known processes of vacuum bag processing, crushed core processing, and MOP processing as described above.

For example, the sandwich panel pre-assembly 2 is disposed on a lower mould and then subjected to vacuum bagging over the sandwich panel pre-assembly 2 in a process well known to those skilled in the art. The laid-up mould is placed in an oven or autoclave and the sandwich panel pre-assembly is heated to a curing temperature of the at least one epoxide-containing resin by the at least one catalyst.

During the heating step, the at least one epoxide-containing resin, and optionally the at least one catalyst, in the prepreg of the layer(s) 10, 12 liquefy to form a liquid-forming component which wets the surface(s) 10, 12 of the core layer 4. Preferably, the liquid-forming component which wets the surface of the core layer 4 has a weight of from 140 to 205 g/m$^2$. Typically, the liquid-forming component has a weight of from 150 to 180 g/m$^2$, typically from 155 to 170 g/m$^2$.

The heating step cures the at least one epoxide-containing resin to form the layer(s) of fibre-reinforced composite material 30, 32 bonded to the core layer 4.

Typically, during the heating step, the prepreg layer(s) 10, 12 and core layer 4 are pressed together (for example by vacuum bag processing, crushed core processing, and MOP processing). The prepreg layer(s) 10, 12 and the core layer 4 may be pressed together for a period of from 5 to 20 minutes at a temperature of from 125 to 185° C., the temperature being at least the curing temperature of the epoxy resin system including the catalyst. The prepreg layer(s) 10, 12 and core layer 4 may be pressed together to form a moulded sandwich panel 22 having a three dimension moulded shape.

The upper and lower moulds each form a moulded surface of the sandwich panel. Typically, the lower mould forms a higher quality surface finish than the upper mould, and the lower mould forms a sufficiently high quality surface finish, with low porosity and void content to enable that moulded surface to be used as a high quality cosmetic "A" surface, for example as an interior cosmetic "A" surface of an aircraft cabin.

The preferred embodiments of the present invention provide an epoxy resin prepreg that has very good FST properties, in particular smoke and heat release. In addition it has good mechanical properties, surface finish quality, and there is no condensation reaction in contrast to phenolic resins, and a fast cure time that provide the epoxy resin prepreg with numerous advantages over the current phenolic materials that are currently commercially used to produce aircraft interior panels, and panels for other transportation applications, such as in trains. The preferred embodiments of the present invention provide a sandwich panel which exhibits the combination of the key characteristics of a high quality surface finish coupled with high FST properties as a function of the resin content of the prepreg relative to the solid filler content provided by the fire retardant component and in particular the liquid resin content of the prepreg during curing.

The epoxide resin employed in accordance with the preferred embodiments of the present invention is a catalytically-cured non-elimination resin. Therefore no volatiles are released during cure. As compared to condensation-cured resins, such as phenolic resins, this provides the advantage of allowing components to be cured using lower-cost vacuum bag technology with significantly reduced refinishing and processing costs.

The epoxide resin employed in accordance with the preferred embodiments of the present invention is a halogen-free, modified-epoxide matrix resin and unlike phenolic systems, does not contain residual phenol or solvents. This means that it can be used in aircraft interior parts such as cosmetic cabin panels and in air-conditioning ducting without the risk of toxic phenol being leached into the passenger air supply. The halogen-free, epoxide matrix resin avoids the smoke toxicity issues associated with halogenated epoxides.

Fire-retardant fillers were added to the epoxide resin matrix employed in accordance with the preferred embodiments of the present invention to improve the smoke release and smoke toxicity properties of the matrix resin.

The present invention has particular application in the manufacture of multilaminar composite sandwich panels comprising a central core, for example of a honeycomb material itself known in the art, and two opposed outer plies comprising fibre-reinforced composite material incorporating a resin matrix produced in accordance with the present invention.

The preferred embodiments of the present invention provide a prepreg epoxide-containing resin which exhibits a combination of properties in order to achieve sufficient peel adhesion to a core such as a honeycomb core, a high surface quality, for example to provide a cosmetic "A" surface finish, and good FST properties.

First, the epoxide-containing prepreg resin is formulated to have a liquid resin content during cure which is sufficiently high to assure sufficient resin flow during cure in order to form sufficient contact area with the honeycomb cell surface to achieve good adhesion and to have a low void content in the cured resin so that the surface quality of the resultant sandwich panel is high.

Second, the epoxide-containing prepreg resin is formulated to have a liquid resin content during cure which is sufficiently low to reduce the heat and smoke release from the cured resin so that the FST properties of the resultant sandwich panel are high, and in particular comply with the minimum FST properties to qualify for use inside aircraft cabins.

In other words, a preferred arrange for the liquid resin content during cure provides the combination of (i) high surface quality of the resultant sandwich panel and (ii) high FST properties of the resultant sandwich panel, which comply with the minimum FST properties to qualify for use inside aircraft cabins.

The modified epoxide-containing matrix resin system used in the prepregs, resultant cured composite materials, and sandwich panels of the present invention has particular application for use for interior panel construction for mass transport applications where a fire, smoke and toxicity requirement is necessary. The composite materials made using such a resin can provide significant advantages over the known resins discussed above, such as phenolic, cyanate-ester, SMC, modified vinyl-ester and halogenated epoxides which have been used in the past for these applications.

The epoxide-containing matrix resin of the preferred embodiments of the present invention may be used in structural applications where fire, smoke and toxicity performance that is similar to phenolic materials is required yet with greatly increased surface quality, and also good mechanical properties such as peel strength of the outer composite material layer to the core of a sandwich panel.

Additional advantages include ease of processing and reduced refinishing which allow substantial capital and production cost reductions.

Phenolic resin panels tend to be dark brown in colour and so are commonly painted to achieve the desired component colour. The paint can also improve the surface finish. Problems can occur during service whereby if the material is scratched; the base colour of the phenolic becomes highly visible. The epoxide-containing matrix resin of the preferred embodiments of the present invention may be white in colour which reduces the visual impact of such scratching during use, and does not require painting, in particular because the surface finish is high.

The epoxide-containing matrix resin of the preferred embodiments of the present invention can provide a number of technical benefits as compared to known prepregs and composite materials having fire and/or smoke resistance. In particular, there may be provided in accordance with the present invention:

i. A phenol-free alternative to phenolic prepregs.
ii. No volatiles are released during cure—improved mechanical properties.
iii. Does not require high-pressure press tooling to process, can use low-cost vacuum-bag technology.
iv. High-quality surface finish "straight from tooling"—does not require expensive and time-consuming refinishing.
v. Pale-colour—requires less surface coating to achieve desired aesthetic and results in increased longevity during operation (i.e. scratches etc. are less visible).

The modified epoxide material produced in accordance with the present invention may be used by manufacturers of composite prepregs and sandwich panels for use in a wide-range of fire-retardant applications. The prepreg offers an alternative to a wide-range of existing fire-retardant materials including (but not limited to) phenolics, halogenated epoxides, and cyanate esters but with significant advantages of the combination of enhanced fire-retardant, smoke and toxicity (FST) properties, enhanced good surface quality, and good mechanical properties, together with good resin processing.

The preferred embodiments of the present invention will now be described further with reference to the following non-limiting Examples.

Example 1

A prepreg was formed comprising a single ply of woven glass fibre as a fibrous reinforcement and an epoxide resin matrix system of the present invention.

The epoxide resin matrix system comprised, as a first component, the combination of (i) an epoxide-containing resin and (ii) a catalyst for curing the an epoxide-containing resin of the present invention.

The epoxide resin matrix system further comprised, as a second component, fire retardant/non-flammable solid fillers. The fire retardant fillers comprised ammonium polyphosphate, melamine powder, and glass beads.

The epoxide resin matrix system comprised 52.34 wt % epoxide-containing resin, 9.91 wt % catalyst and 37.75 wt % fire retardant/non-flammable solid fillers, based on the total weight of the epoxide resin matrix system.

The total weight of the prepreg was 555 gsm, comprised of 300 gsm woven glass fibre and 255 gsm of the epoxide resin matrix system, which included the epoxide resin, the catalyst and the solid fillers. This provided 46 wt % epoxide resin matrix system content and 54 wt % fibrous reinforcement content in the prepreg (however the fabric weight has a tolerance variation of +/−10 wt %, with consequential tolerance in the wt % of epoxide resin matrix system content in the prepreg). The prepreg was formulated so that upon curing at the elevated curing temperature of 150° C., the liquid content of the prepreg was 159 gsm.

The composition of the epoxide resin matrix system, expressed as weight per unit area (gsm), is shown in Table 1.

TABLE 1

| | Example 1 - gsm |
|---|---|
| Mixture of epoxide-containing resin and a catalyst | 159 |
| Solid fillers for fire retardancy | 96 |
| Glass fibres as fibrous reinforcement | 300 |
| Total Prepreg weight | 555 |
| Liquid content of prepreg at the cure temperature which comprised liquefied epoxide-containing resin and catalyst | 159 |

Therefore the weight ratio of the first component to the second component was 1.6:1. The prepreg comprised 46 wt % of the epoxide resin matrix system and 54 wt % fibrous reinforcement, each wt % being based on the total weight of the prepreg. The weight ratio of the total weight of the prepreg to the weight of the fire retardant solid fillers was 5.78:1.

A honeycomb core material composed of aramid fiber paper coated with a phenolic resin, in particular composed of Nomex® available in commerce from Du Pont, USA, was provided. The core had a thickness of 3.2 mm. A single ply of the prepreg was disposed over each opposite major surface of the core and the resultant three-layer assembly of prepreg/core/prepreg was placed in a laboratory scale moulding press configured to press panels to a fixed thickness defined by a closure gap between upper and lower platens, and cured under pressure of 12.1 bar for a period of 10 minutes at the curing temperature of 150° C.

The resultant sandwich panel was subjected to a number of tests to determine the surface quality of the sandwich panel, the FST (in particular the fire-retardance and smoke suppression) properties of the sandwich panel and the mechanical property of peel strength.

Figure 3:
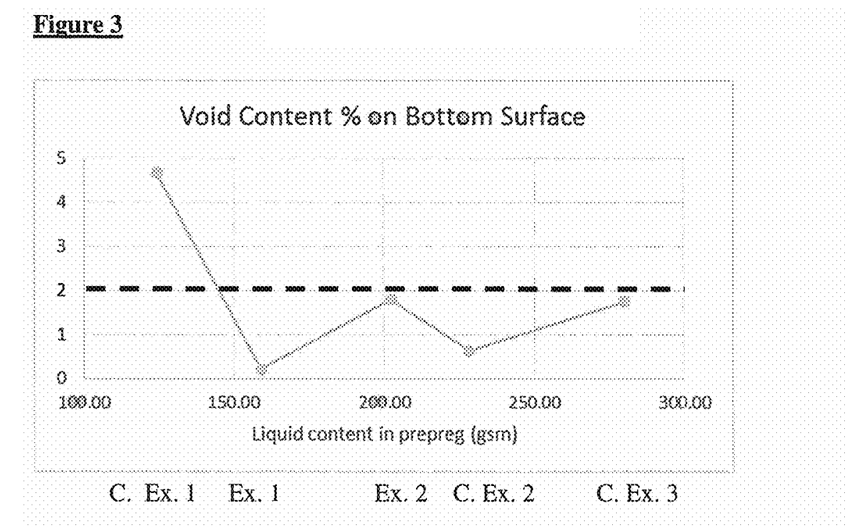
FIG. 3 is a graph showing the relationship between the void content on the bottom face of a sandwich panel and liquid content in the prepreg in Examples of the present invention and Comparative Examples.

The void content on the bottom surface of the sandwich panel was measured. In the measuring process, a black ink was applied to the surface and then wiped using a dry cloth. This resulted in pigmentation of depressed areas (voids). Surface scans were taken of the panel surface and image analysis software was used to calculate the percentage area of ink using contrast detection methods. The results are shown in Table 2 and FIG. 3.

Figure 4:
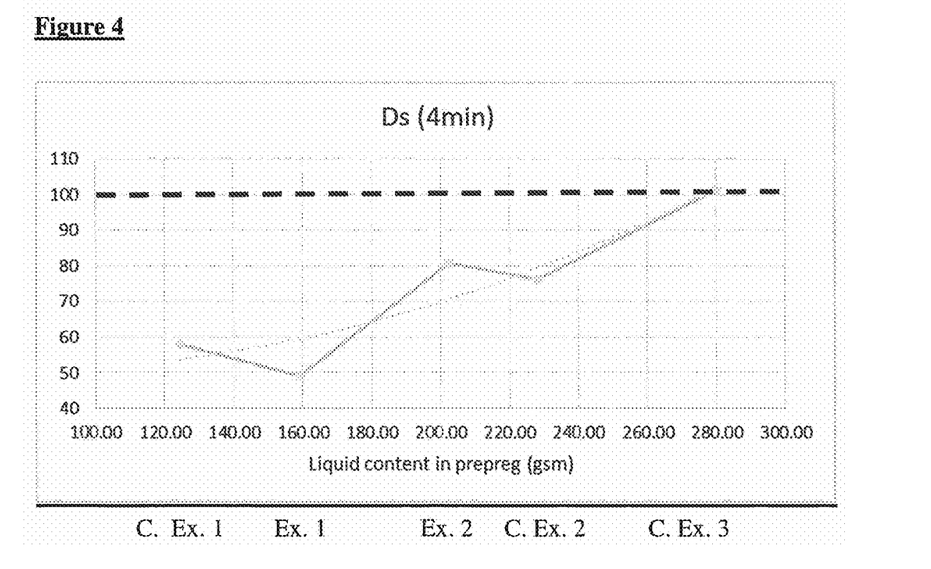
FIG. 4 is a graph showing the relationship between the smoke density of a sandwich panel and liquid content in the prepreg in Examples of the present invention and Comparative Examples.
Figure 5:
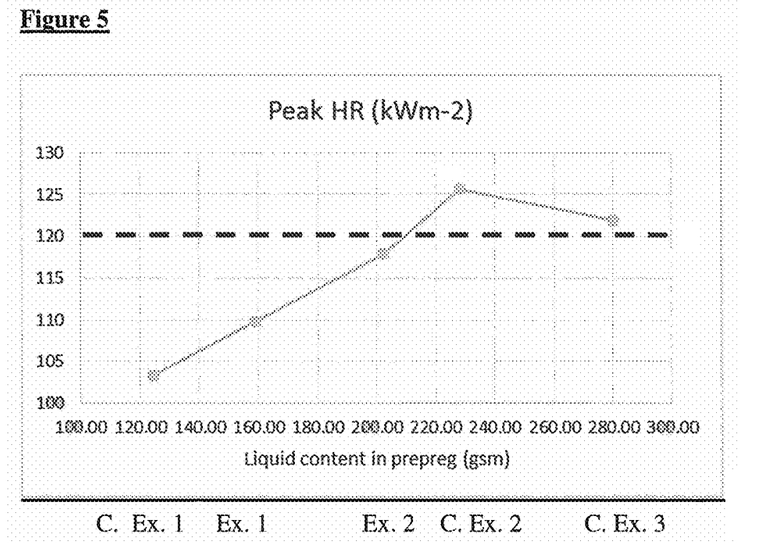
FIG. 5 is a graph showing the relationship between the peak heat release of a sandwich panel and liquid content in the prepreg in Examples of the present invention and Comparative Examples.

The sandwich panel was tested during combustion to measure the smoke density (Ds, a unitless parameter), after a combustion period of 4 minutes, and the peak heat release (Peak HR in $kW/m^2$); the results are shown in Table 2 and FIGS. 4 and 5. The peak heat release was measured using a cone calorimeter that was used to evaluate the combusting sandwich panel.

The Peak HR value refers to a cone calorimeter measurement which is not the same as the Ohio State University (OSU) heat release parameter specified in the Federal Aviation Regulations (FAR) of the United States of America. The cone calorimeter values are systematically higher than the OSU values, and the cone calorimeter and OSU values demonstrate a positive mutual correlation. Therefore the cone calorimeter values represent compliance with the OSU standard.

Figure 6:
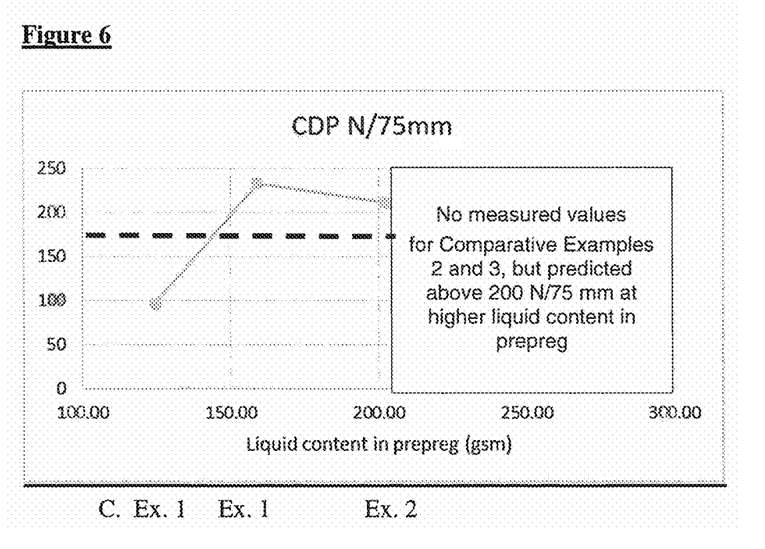
FIG. 6 is a graph showing the relationship between the climbing drum peel strength of a sandwich panel and liquid content in the prepreg in Examples of the present invention and Comparative Examples.

Finally, the climbing drum peel strength (CDP in N/75 mm) was measured to measure the peel strength of the composite material ply on the core layer; the results are shown in Table 2 and FIG. 6.

The data shows that providing a liquid content in the prepreg upon curing of 159 gsm achieved a low void content, less than 2%, on the bottom surfaces of the sandwich panel. The measured void content was significantly lower than would be achieved is using a phenolic resin in the outer layer plies of the sandwich panel. This low void content is below a desired maximum threshold of 2%, indicated by the dashed line in FIG. 3, to permit the surface to be used as a high quality cosmetic "A" surface of the moulded panel.

The data also showed that providing a liquid content in the prepreg upon curing of 159 gsm achieved a low smoke density and low peak heat release. FIG. 4 shows the smoke density Ds was below a desired maximum threshold of 100, indicated by the dashed line in FIG. 4. FIG. 5 shows that the peak heat release, peak HR, was below a desired maximum threshold of 120 kW/m$^2$, indicated by the dashed line in FIG. 5. This liquid resin content provided good fire retardant properties and good smoke suppression to the sandwich panel, which were comparable to results obtained using a phenolic resin in the outer layer plies of the sandwich panel.

It is to be noted that the maximum threshold values for some density and peak heat release vary depending on the specific application (e.g. location, assembly and modifications of the panel when used in an aircraft). The Federal Aviation Regulations (FAR) of the United States of America state a value of <200 Ds (4 minutes) for smoke density and 65 kW/m$^2$ for heat release after both 2 minutes and at peak heat release rate using OSU heat release methods. The panel of Example 1 clearly meets these criteria. However, it is important to note that panels are often post-processed with surface coverings (paints, protective films, carpeting etc), and therefore limits for laminates are often required to be significantly lower than these FAR limits, depending on the specific application.

Furthermore, the climbing drum peel strength was high, about 200 N/75 mm, and higher than typical results obtained using a phenolic resin, for example typically 70-90 N/75 mm, in the outer layer plies of the sandwich panel. FIG. 6 shows the climbing drum peel strength was above a desired minimum threshold of 175 N/75 mm, indicated by the dashed line in FIG. 6. The high climbing drum peel strength exhibits improved toughness and adhesion of the single composite ply to the core and allows lighter weight structures to be engineered for applications in and outside of aerospace.

In summary, the use of an epoxy resin system within the scope of the present invention for the outer surface ply of a sandwich panel was found to provide an improved combination of properties as compared to known phenolic resin sandwich panel. In particular, the surface finish is improved without materially compromising the FST properties, and the mechanical property of the climbing drum peel strength may be improved. While the FST properties of an epoxy resin system within the scope of the present invention may be slightly worse than comparable phenolic resin system, the FST properties are nevertheless still comfortably within the requirements for a resin (which may be phenolic) in current aerospace standards set by major aircraft manufacturers and by the Federal Aviation Regulations (FAR) of the United States of America. Moreover, surface properties, mechanical properties and peel strength of the epoxy resin system within the scope of the present invention are improved compared to a comparable phenolic resin system. These improved properties can be achieved without requiring high pressure moulding or high temperature autoclaving.

TABLE 2

|  | Liq. Content of prepreg (gsm) | Voids on bottom face (%) | Ds (4 min) | Peak HR (kW/m$^2$) | CDP (N/75 mm) |
|---|---|---|---|---|---|
| Ex. 1 | 159 | 0.2 | 49.1 | 109.8 | 233 |
| Ex. 2 | 202 | 1.8 | 80.8 | 117.9 | 211 |
| C. Ex. 1 | 125 | 4.7 | 58.1 | 103.3 | 96 |
| C. Ex. 2 | 229 | 0.6 | 76.3 | 126.0 | No value |
| C. Ex. 3 | 280 | 1.8 | 101.5 | 121.9 | No value |

Example 2

Example 1 was repeated, using the same fabric, but the ratio of the first and second components of the epoxide resin matrix system was modified to provide that liquid content of the resin upon curing was increased to 202 gsm.

Again, the sandwich panel was tested to measure the void content on the bottom surface of the sandwich panel, the smoke density, the peak heat release, and the climbing drum peel strength, and the results are again shown in Table 2 and FIGS. 3 to 6.

The data shows that providing a liquid content in the prepreg upon curing of about 200 gsm again achieved a low void content, below the 2% desired maximum threshold, on the bottom surface of the sandwich panel. The measured void content was significantly lower than would be achieved is using a phenolic resin in the outer layer plies of the sandwich panel.

The data also showed that providing a liquid content in the prepreg upon curing of about 200 gsm achieved a higher smoke density, and peak heat release as compared to the 159 gsm liquid content of Example 1. However, these values in Example 2 were still acceptable, below the desired maximum thresholds shown in FIGS. 4 and 5, and provided good fire retardant properties and good smoke suppression to the sandwich panel, which were comparable to results obtained using a phenolic resin in the outer layer plies of the sandwich panel.

Furthermore, the climbing drum peel strength was again high, similar to Example 1, and above the desired minimum threshold shown in FIG. 6.

Comparative Example 1

Example 1 was repeated, using the same fabric, but the ratio of the first and second components of the epoxide resin matrix system was modified to provide that liquid content of the resin upon curing was decreased to 125 gsm.

Again, the sandwich panel was tested to measure the void content on the bottom surface of the sandwich panel, the smoke density, the peak heat release, and the climbing drum peel strength, and the results are again shown in Table 2 and FIGS. 3 to 6.

The data shows that providing a low liquid content in the prepreg upon curing of about 125 gsm, the void content on the bottom surface of the sandwich panel was unacceptably high, above the 2% desired maximum threshold. The measured void content would not provide any significant improvement over the known use of a phenolic resin in the outer layer plies of the sandwich panel.

The data also showed that providing a low liquid content in the prepreg of about 125 gsm achieved even lower smoke density and peak heat release as compared to the 159 gsm liquid content of Example 1. This is believed to result from the reduced resin content providing a lower organic material content for combustion. The climbing drum peel strength was low, below the desired minimum threshold shown in FIG. 6.

In summary, Comparative Example 1 shows that a minimum liquid content in the epoxy resin prepreg upon curing is required to achieve a combination of both a good surface finish and FST properties, and good mechanical properties.

Comparative Examples 2 and 3

Example 1 was repeated, using the same fabric, but the ratio of the first and second components of the epoxide resin matrix system was modified to provide that liquid content of the resin upon curing was increased to 229 gsm for Comparative Example 2 and 280 gsm for Comparative Example 3.

Again, the sandwich panel was tested to measure the void content on the bottom surface of the sandwich panel, the smoke density, the peak heat release, and the climbing drum peel strength, and the results are again shown in Table 2 and FIGS. 3 to 6.

The data shows that providing a high liquid content in the prepreg upon curing of about 230 gsm or about 280 gsm, can provide a low void content on the bottom surface of the sandwich panel which would provide a significant improvement over the known use of a phenolic resin in the outer layer plies of the sandwich panel.

However, the data also showed that providing a high liquid content in the prepreg upon curing of above about 230 gsm resulted in high smoke density and high peak heat release, at least the peak heat release value being unacceptably high, and higher than the desired maximum value shown in FIG. 5, as compared to the 159 gsm and about 200 gsm liquid content of Examples 1 and 2. This is believed to result from the increased resin content providing a higher organic material content for combustion. The climbing drum peel strength was difficult to measure for both of these Comparative Examples, and so values are not shown in FIG. 6 or Table 2.

In summary, Examples 1 and 2 and Comparative Examples 1 to 3 cumulatively show that by providing a selected range for the liquid content in the epoxy resin prepreg upon curing, the desired combination of both a good surface finish and high FST properties can be achieved in a sandwich panel having epoxy resin composite material outer plies.

Various modifications to the preferred embodiments of the present invention will be apparent to those skilled in the art.

The invention claimed is:

1. The prepreg for the manufacture of a fibre-reinforced composite material having fire retardant properties, the prepreg comprising from 42 to 52 wt % of an epoxide resin matrix system and from 48 to 58 wt % fibrous reinforcement, each wt % being based on the total weight of the prepreg, the fibrous reinforcement being at least partially impregnated by the epoxide resin matrix system;

wherein the epoxide resin matrix system comprises the components:
a. a mixture of (i) at least one epoxide-containing resin and (ii) at least one catalyst for curing the at least one epoxide-containing resin, component (a) forming a cured epoxide resin matrix after catalytic curing of the at least one epoxide-containing resin by the at least one catalyst; and
b. a plurality of solid fillers for providing fire retardant properties to the fibre-reinforced composite material formed after catalytic curing of the at least one epoxide-containing resin, wherein the solid fillers for providing fire retardant properties comprise (i) a phosphate component and (ii) (a) a ceramic or glass material precursor for reacting with the phosphate component to form a ceramic or glass material and/or (b) a ceramic or glass material, wherein the weight ratio of component a. to component b. is from 1.4:1 to 1.86:1; and wherein the at least one epoxide-containing resin, and the at least one catalyst, comprise a liquid-forming component of the prepreg, which liquid-forming component is adapted to liquefy at a curing temperature during curing of the at least one epoxide-containing resin by the at least one catalyst, and wherein the liquid-forming component of the prepreg has a weight of from 140 to 205 g/m².

2. The prepreg according to claim 1 wherein the weight ratio of component a. to component b is from 1.5:1 to 1.86:1, from 1.6:1 to 1.7:1, from 1.625:1 to 1.675:1 or about 1.65:1.

3. The prepreg according to claim 1 wherein the prepreg comprises from 44 to 52 wt % of the epoxide resin matrix system and from 48 to 56 wt % of the fibrous reinforcement, each wt % being based on the total weight of the prepreg or wherein the prepreg comprises from 46 to 50 wt % of the epoxide resin matrix system and from 50 to 54 wt % of the fibrous reinforcement, each wt % being based on the total weight of the prepreg.

4. The prepreg according to claim 1 wherein the prepreg has a total weight of from 500 to 650 g/m².

5. The prepreg according to claim 1 wherein the fibrous reinforcement has a weight of from 250 to 350 g/m², or from 275 to 325 g/m².

6. The prepreg according to claim 1 wherein the liquid-forming component of the prepreg has a weight of from 150 to 180 g/m² or from 155 to 170 g/m².

7. The prepreg according to claim 1 wherein the weight ratio of the total weight of the prepreg to the weight of component b is from 4.5:1 to 6.5:1 or from 5:1 to 6:1.

8. The prepreg according to claim 1 wherein the prepreg is halogen-free and/or phenolic resin-free.

9. The prepreg according to claim 1 further comprising, in component b, a blowing agent as a fire retardant for generating a non-combustible gas when the prepreg, or fibre-reinforced composite material made therefrom, is exposed to a fire, and the fire retardant solid fillers and blowing agent are adapted to form an intumescent char when the epoxide resin is exposed to a fire.

10. The prepreg according to claim 9 wherein the phosphate component comprises a metal or ammonium polyphosphate, and/or the ceramic or glass material precursor comprises a metal borate, or zinc borate, and/or the ceramic or glass material comprises glass beads and/or the blowing agent comprises melamine.

11. The prepreg according to claim 1 wherein the epoxide resin matrix system further comprises, in component b, at least one anti-settling agent for the solid fillers, wherein the anti-settling agent is a solid particulate material.

12. The prepreg according to claim 11 wherein the at least one anti-settling agent comprises silicon dioxide, amorphous silicon dioxide, or fumed silica.

13. The prepreg according to claim 11 wherein the at least one anti-settling agent is present in an amount of from 0.5 to 1.5 wt % based on the weight of component a.

14. A fire-retardant sandwich panel for use as an interior wall element in a vehicle, the sandwich panel comprising a core layer and an outer surface layer bonded to a surface of the core layer, wherein the outer surface layer comprises a fibre-reinforced composite material formed from at least one layer of a prepreg according to claim 1, the fibre-reinforced composite material comprising the fibrous reinforcement in a matrix of the cured epoxide resin.

15. The fire-retardant sandwich panel according to claim 14 wherein the outer surface layer comprises a fibre-reinforced composite material formed from a single layer of the prepreg according to claim 1.

16. The fire-retardant sandwich panel according to claim 14 wherein the core layer is a central core layer having opposite surfaces and two of the outer surface layers are provided, each outer surface layer being bonded to a respective opposite surface of the core layer.

17. The fire-retardant sandwich panel according to claim 14 wherein the core layer is composed of a structural core material comprising a non-metallic honeycomb material, or a honeycomb material composed of aramid fiber paper coated with a phenolic resin, or wherein the core layer is composed of a structural core material comprising a metallic honeycomb material composed of aluminum or an aluminum ahoy.

18. The fire-retardant sandwich panel according to claim 14 which is moulded to comprise an interior panel of a vehicle, or an aircraft or a railway vehicle.

19. A method of making the fire-retardant sandwich panel according to claim 14, the method comprising the steps of:
  i. providing a core layer;
  ii. disposing a prepreg according to claim 1 onto a surface of the core layer to form a sandwich panel pre-assembly;
  iii. heating the sandwich panel pre-assembly to a curing temperature of the at least one epoxide-containing resin by the at least one catalyst, wherein in step iii the at least one epoxide-containing resin, or the at least one epoxide-containing resin and the at least one catalyst, liquefy and wet the surface of the core layer.

20. The method according to claim 19 further comprising, during the heating step, pressing together the prepreg and core layer while curing the at least one epoxide-containing resin to form the layer of fibre-reinforced composite material bonded to the core layer.

21. The method according to claim 20 wherein the prepreg and core layer are pressed together for a period of from 5 to 20 minutes at a temperature of from 125 to 185° C.

22. The method according to claim 20 wherein in step iii the prepreg and core layer are pressed together to form a moulded panel having a three dimension moulded shape.

23. The method according to claim 19 wherein the core layer is a central core layer having opposite surfaces and two prepregs are provided, each prepreg being disposed on a respective opposite surface of the core layer.

* * * * *

UNITED STATES PATENT AND TRADEMARK OFFICE
CERTIFICATE OF CORRECTION

PATENT NO. : 11,149,126 B2  
APPLICATION NO. : 16/764220  
DATED : October 19, 2021  
INVENTOR(S) : Paul John Spencer, Glynn John Edwards and Amy Alexandra Ferris It is certified that error appears in the above-identified patent and that said Letters Patent is hereby corrected as shown below:

In the Claims

Column 17, Line 57 (Claim 1) - "The" should be "A".

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*